United States Patent [19]
Deneve et al.

[11] Patent Number: 6,062,334
[45] Date of Patent: May 16, 2000

[54] FRAME ASSEMBLY FOR A CONSTRUCTION MACHINE AND AN ASSOCIATED METHOD OF MANUFACTURING THE FRAME ASSEMBLY

[75] Inventors: Jeffrey A. Deneve, Sanford, N.C.; Robert E. Klimko, Peoria; Morris W. Koehler, Eureka, both of Ill.; Owen S. Loughrin, Sanford, N.C.; Charles T. McMillan, Pittsboro, N.C.; Richard A. Naugle, Fuquay-Varina, N.C.; Charles F. Sieck, Dunlap, Ill.; Alfred C. Wingate, Fuquay-Varina, N.C.

[73] Assignee: Caterpillar Inc., Peoria, Ill.

[21] Appl. No.: 09/072,151

[22] Filed: May 4, 1998

Related U.S. Application Data

[60] Provisional application No. 60/051,317, Jun. 30, 1997.

[51] Int. Cl.[7] .................................................. B62D 21/00
[52] U.S. Cl. ............................................ 180/311; 296/203
[58] Field of Search ..................... 280/781, 400; 180/311, 53.3, 900; 296/194, 203

[56] References Cited

U.S. PATENT DOCUMENTS

| | | |
|---|---|---|
| 3,057,496 | 10/1962 | Garske ..................................... 214/140 |
| 3,237,790 | 3/1966 | Kampert et al. ......................... 214/132 |
| 3,326,312 | 6/1967 | Buller ........................................ 180/14 |
| 3,521,719 | 7/1970 | Forpahl ..................................... 180/51 |
| 3,521,720 | 7/1970 | Korotkin ................................... 180/51 |
| 4,081,046 | 3/1978 | Stone .................................... 180/14 B |
| 4,163,498 | 8/1979 | Grooss et al. .......................... 414/697 |
| 4,245,714 | 1/1981 | Kersey .................................... 180/265 |
| 4,768,917 | 9/1988 | Garman .................................. 414/697 |
| 5,568,841 | 10/1996 | Weissbach .............................. 180/311 |

*Primary Examiner*—Paul N. Dickson
*Attorney, Agent, or Firm*—Bradford G. Addison

[57] ABSTRACT

A frame assembly includes a central tower portion having a first side wall portion and a second side wall portion. The first side wall portion has a first leg and a first arm each extending therefrom, and the second side wall portion has a second leg and a second arm each extending therefrom. The frame assembly also includes a hitch support assembly having an upper plate and a lower plate vertically spaced from each other. The hitch support assembly also includes a connecting member interposed between and connected to the upper plate and the lower plate. The hitch support assembly is secured to the central tower portion such that a lower end of both the first leg and the second leg are supported on the lower plate. The frame assembly further includes an axle mount assembly having a first axle plate, a second axle plate, and a support member extending therebetween, wherein both the first arm and the second arm are secured to the support member. A method of manufacturing the frame assembly is also disclosed.

13 Claims, 10 Drawing Sheets

Fig_2_

Fig_5_
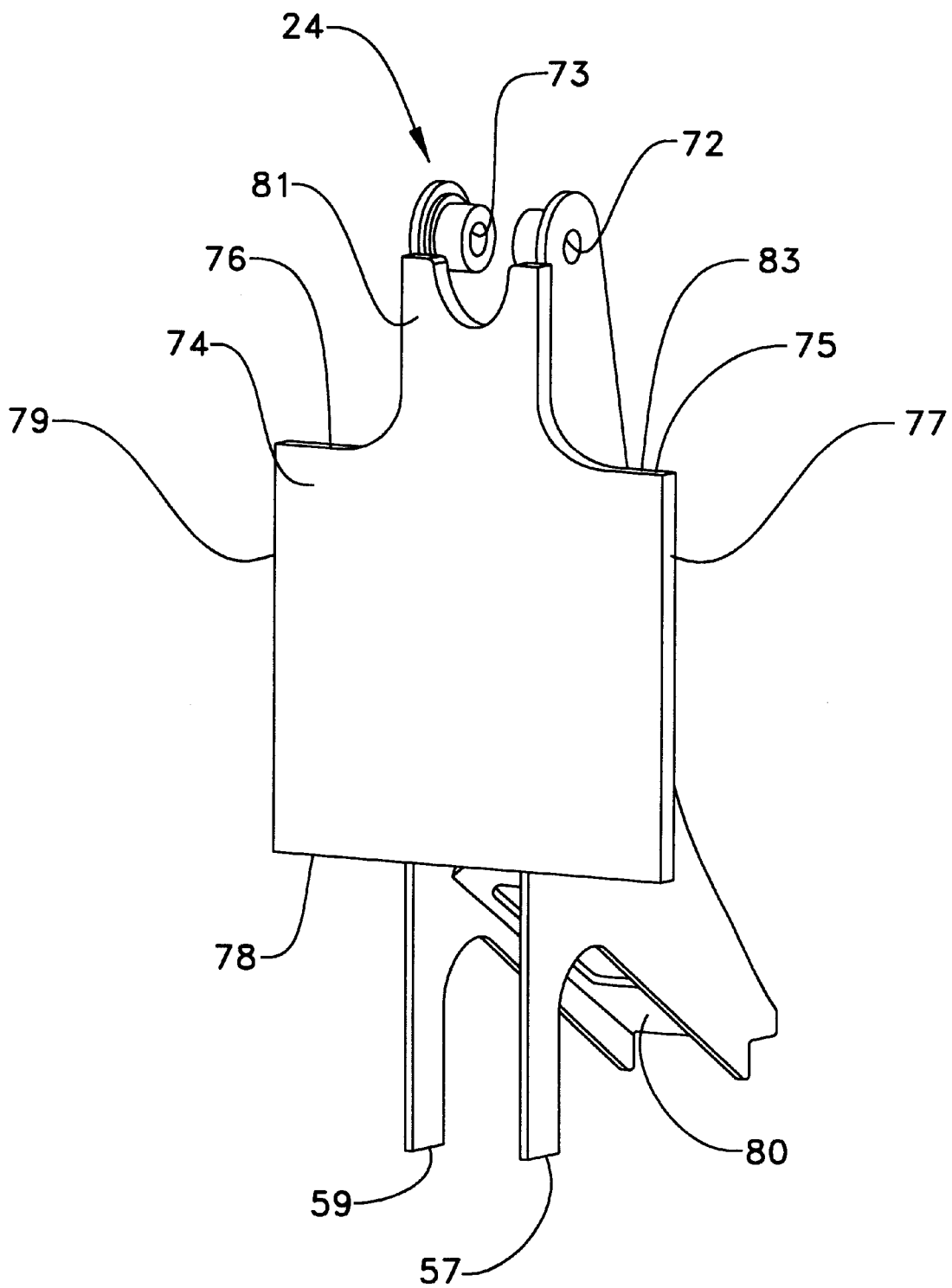

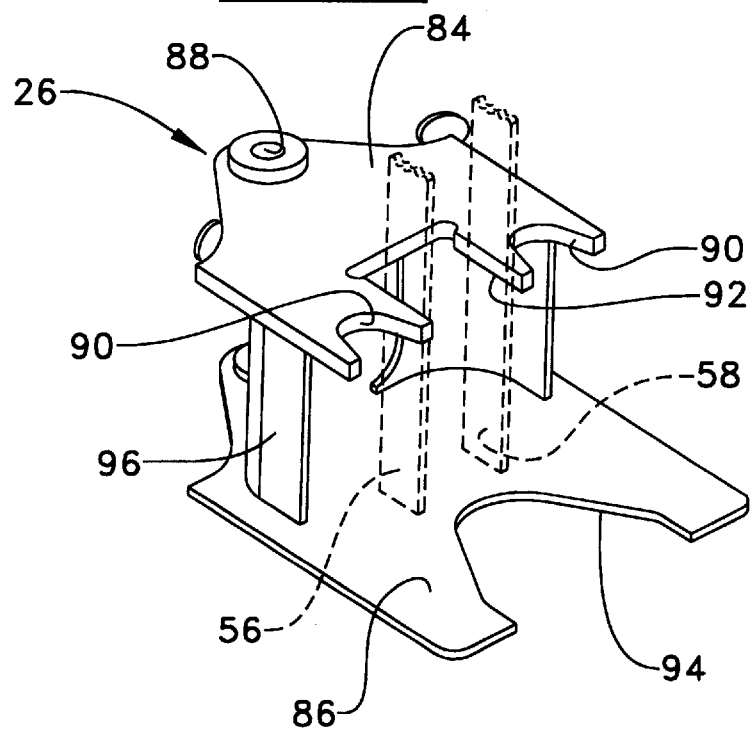
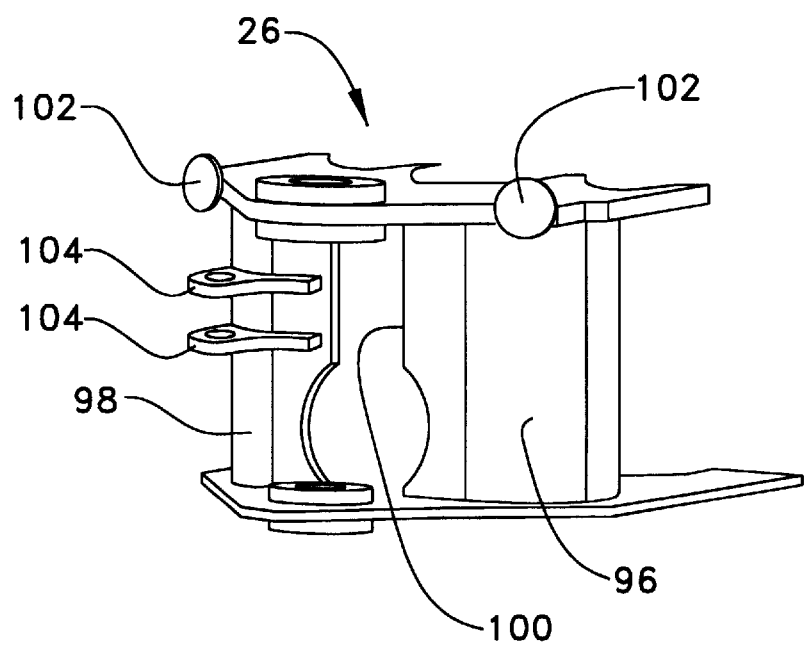

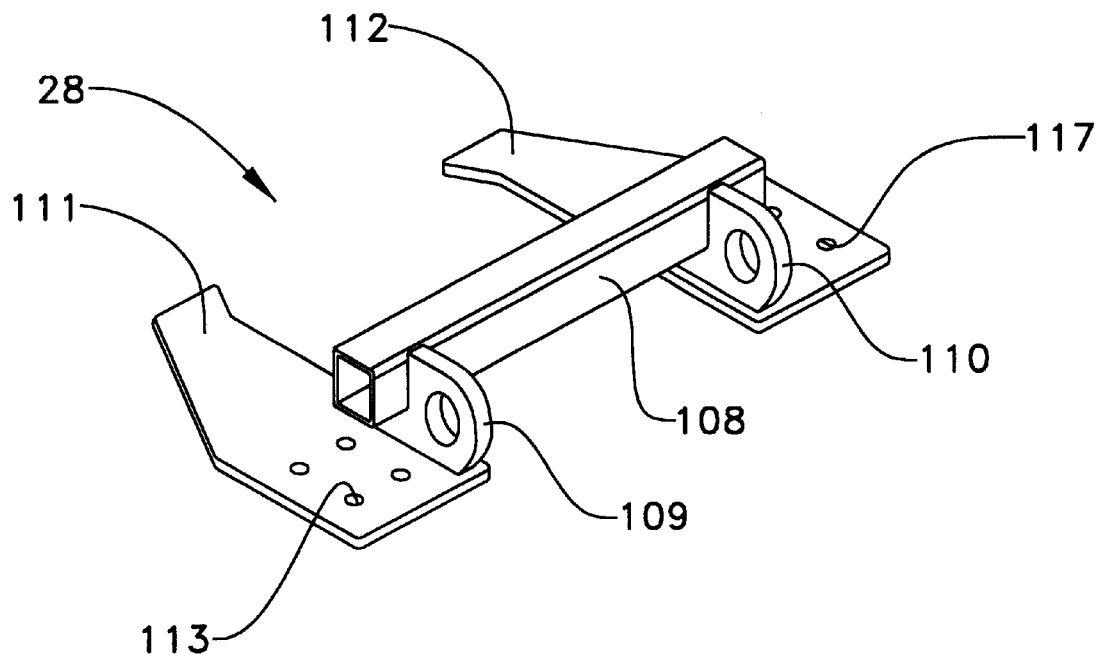
Fig_8_
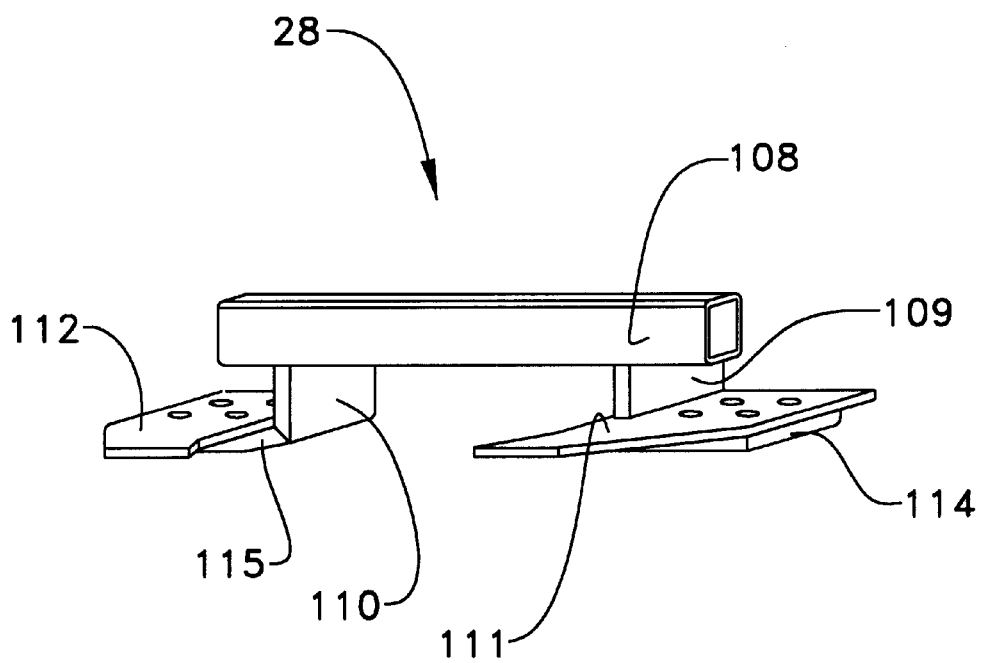
Fig_9_

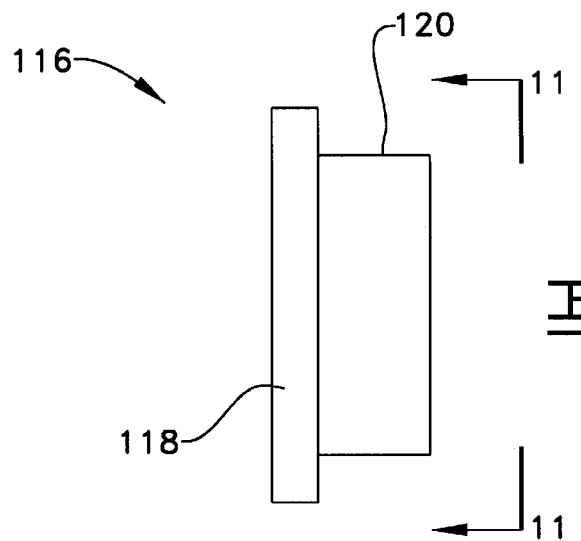
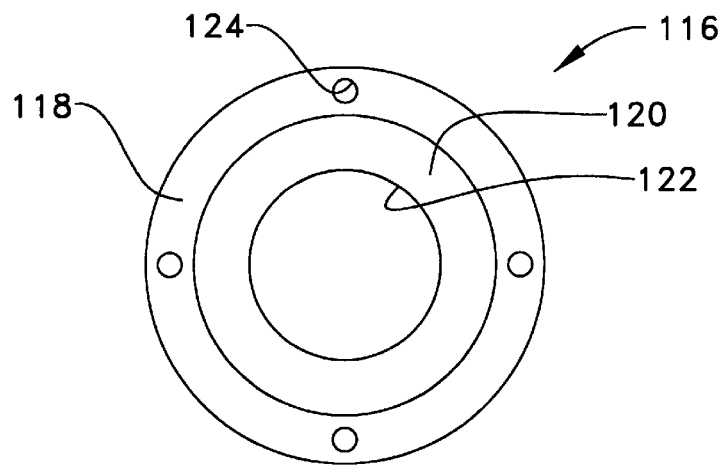
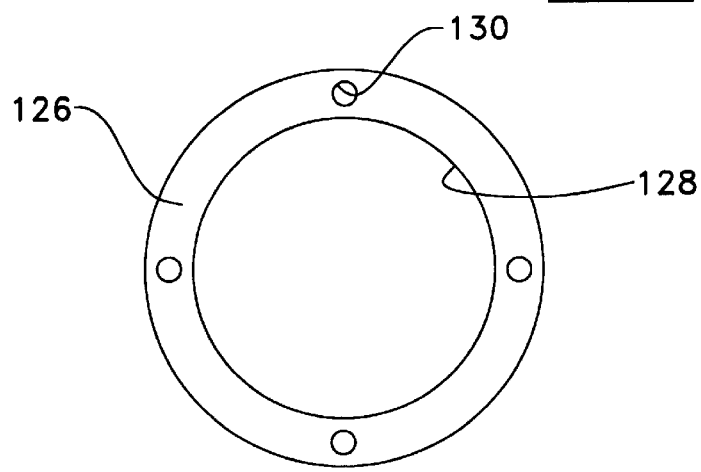

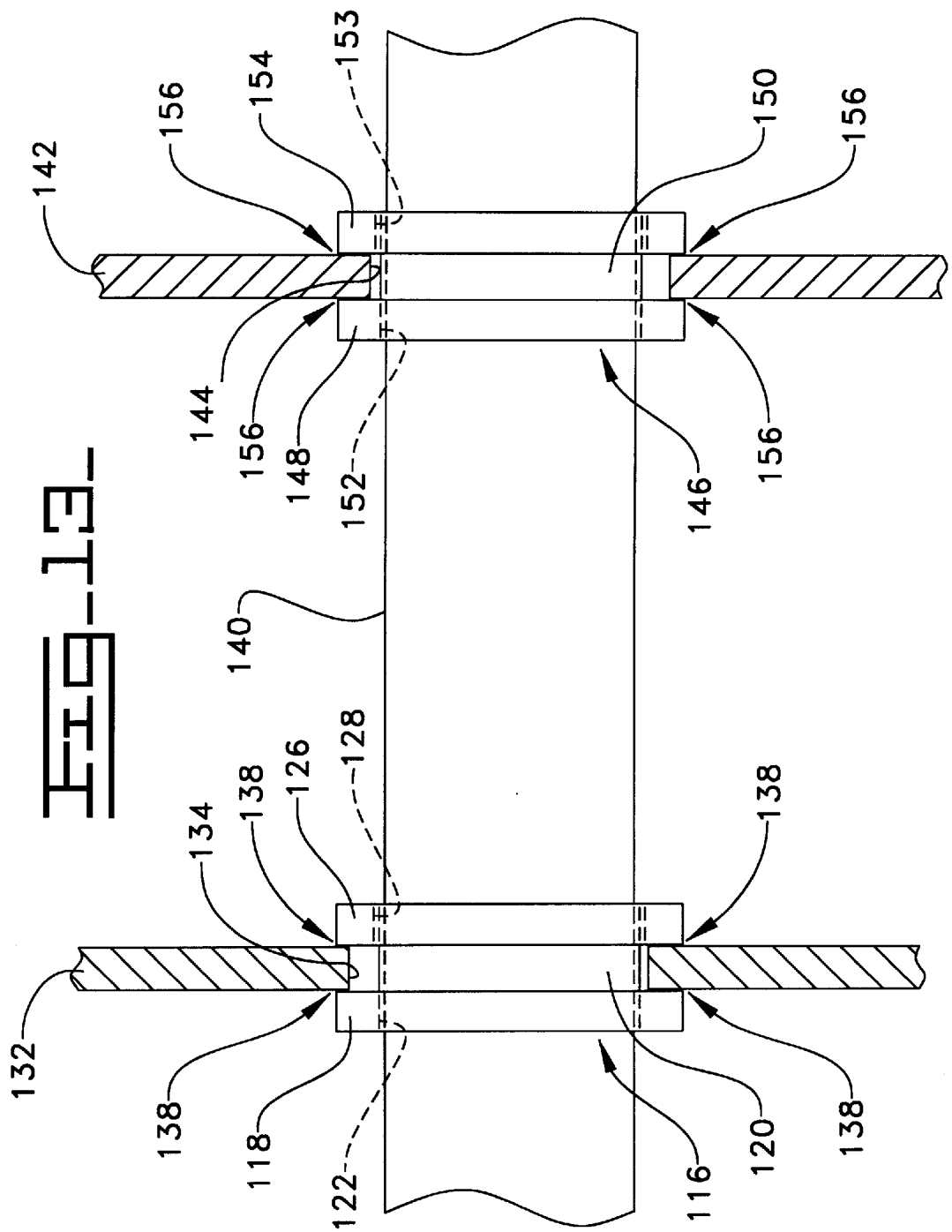

FRAME ASSEMBLY FOR A CONSTRUCTION MACHINE AND AN ASSOCIATED METHOD OF MANUFACTURING THE FRAME ASSEMBLY

CROSS REFERENCE TO RELATED APPLICATIONS

This application is based, in part, on the material disclosed in United States provisional patent application Ser. No. 60/051,317 filed Jun. 30, 1997.

TECHNICAL FIELD

The present invention relates generally to a frame assembly, and more particularly to a frame assembly for a construction machine and an associated method of manufacturing the frame assembly.

BACKGROUND ART

It is desirable to steer a construction machine by rotating a front portion of the construction machine with respect to a rear portion. In order to steer the construction machine in the above described manner, it is necessary to provide two separate frames that are pinned together about a vertical axis. It is also necessary to position and attach a hydraulic cylinder between the front portion and the rear portion to obtain the desired relative rotation or articulation of the construction machine. Typically, engine and drive train components are mounted on a main frame included in the rear portion of the construction machine, and a work implement is mounted on a frame assembly included in the front portion of the machine.

In the case of some construction machines, such as, an articulated wheel loader, the frame assembly is subject to extremely high loads from several different sources. For example, the work implement is generally attached to the frame assembly by a pair of lift arms, each of which are raised and lowered by a pair of lift cylinders that extend between each lift arm and the frame assembly. The combined weight of the lift arms, the lift cylinders, and the work implement results in a substantial load being communicated to the frame assembly. The construction machine also has a mechanism that allows the work implement to be tilted with respect to the lift arms. Tilting the work implement also inputs a substantial load to the frame assembly. In addition, digging, lifting, and bulldozing operations also input a substantial load to the frame assembly.

The requirement that the frame assembly be capable of accommodating such loads inherently results in a frame assembly structure that is quite large. The large size of the frame assembly structure has several disadvantages. Specifically, the overall size, complexity, and weight of the frame assembly increases its manufacturing cost. Additionally, the operation of the construction machine may be hampered because the large size of the frame assembly (1) reduces the lifting capacity of the construction machine and (2) reduces the operator's ability to see the work implement during its use.

The present invention is directed to overcoming one or more of the problems set forth above.

DISCLOSURE OF THE INVENTION

In accordance with one embodiment of the present invention there is provided a frame assembly The frame assembly includes a central tower portion having a first side wall portion and a second side wall portion. The first side wall portion has a first leg and a first arm each extending therefrom, and the second side wall portion has a second leg and a second arm each extending therefrom. The frame assembly also includes a hitch support assembly having an upper plate and a lower plate vertically spaced from each other. The hitch support assembly also includes a connecting member interposed between and connected to the upper plate and the lower plate. The hitch support assembly is secured to the central tower portion such that a lower end of both the first leg and the second leg are supported on the lower plate. The frame assembly further includes an axle mount assembly having a first axle plate, a second axle plate, and a support member extending therebetween, wherein both the first arm and the second arm are secured to the support member.

In accordance with another embodiment of the present invention there is provided a method of manufacturing a frame assembly. The method includes the steps of (a) welding a first side wall portion and a second side wall portion to a back wall portion so as to create a central tower portion, wherein the first side wall portion has a first leg and a first arm each extending therefrom, and the second side wall portion has a second leg and a second arm each extending therefrom, (b) welding an upper plate and a lower plate to a connecting member so as to create a hitch support assembly, wherein (1) the connecting member is interposed between the upper plate and the lower plate, and (2) the upper plate and the lower plate are vertically spaced from each other, (c) welding a first axle plate and a second axle plate to a support member so as to create an axle mount assembly, and (d) welding the central tower portion, the hitch support assembly, and the axle mount assembly together so as to create the frame assembly, wherein step (d) is performed after steps (a), (b), and (c) are performed.

In accordance with yet another embodiment of the present invention there is provided a method of manufacturing a frame assembly. The method includes the steps of (a) creating a first bore in a first frame part, (b) creating a second bore in a second frame part, (c) inserting a first boss within the first bore so that the first boss is positioned in contact with the first frame part, (d) inserting a second boss within the second bore so that the second boss is positioned in contact with the second frame part, (e) positioning an alignment bar simultaneously within the first boss and the second boss so as to cause (1) the first boss to be positioned at a first alignment position relative to the first frame part, and (2) the second boss to be positioned at a second alignment position relative to the second frame part, (f) welding the first boss to the first frame part while the first boss is positioned at the first alignment position, and (g) welding the second boss to the second frame part while the second boss is positioned at the second alignment position.

BRIEF DESCRIPTION OF THE DRAWINGS

FIG. 5 is another perspective view of the central tower portion of the frame assembly of FIG. 2;

FIG. 6 is a perspective view of the hitch support assembly of the frame assembly of FIG. 2, which shows a fragmentary phantom view of the legs of the central tower portion extending through the aperture defined in the upper plate of the hitch support assembly and being supported on the lower plate thereof;

FIG. 7 is another perspective view of the hitch support assembly of FIG. 2;

FIG. 8 is a perspective view of the axle mount assembly of the frame assembly of FIG. 2;

FIG. 9 is another perspective view of the axle mount assembly of FIG. 2;

FIG. 10 is a side elevational view of a top hat boss which is utilized in the method of manufacturing the frame assembly of the present invention;

FIG. 11 is a front elevational view of the top hat boss taken along line 11—11 of FIG. 10 as viewed in the direction of the arrows;

FIG. 12 is front elevational view of a boss which is utilized in the method of manufacturing the frame assembly of the present invention;

FIG. 13 is a side elevational view of a first top hat boss inserted within a first bore of a first frame part and a second top hat boss inserted within a second bore of a second frame part, with a first boss in contact with the first top hat boss and a second boss in contact with the second top hat boss, and an alignment bar simultaneously positioned within the first top hat boss, the second top hat boss, the first boss and the second boss (note that the frame parts are shown in cross-section, and only a fragment of the alignment bar is shown, for clarity of description)

BEST MODE FOR CARRYING OUT THE INVENTION

Figure 1:
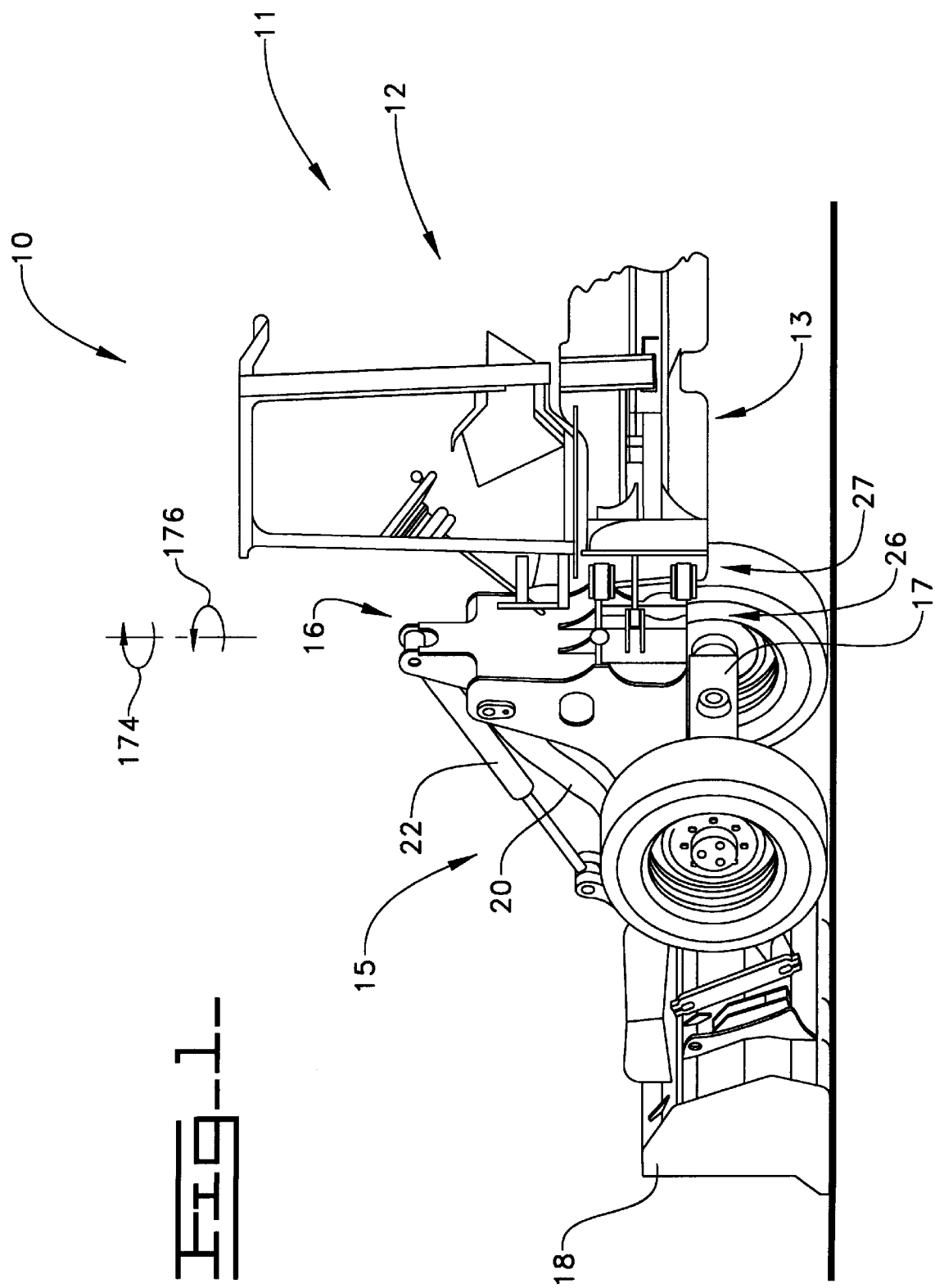
FIG. 1 is a fragmentary perspective view of a construction machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a construction machine 10 which incorporates the features of the present invention therein. Construction machine 10 includes a rear portion 11 and a front portion 15. Rear portion 11 includes a cab assembly 12, a metal main frame 13, a hitch 27 having a pair of hitch pin apertures defined therein (not shown), an engine (not shown), a rear axle housing (not shown) and drive train components (not shown). Cab assembly 12, hitch 27, the engine, the rear axle housing, and the drive train components are all mounted to main frame 13. Front portion 15 includes a metal frame assembly 16, a front axle housing 17, a work implement 18, a boom 20, a tilt cylinder 22, and a lift cylinder (not shown).

Figure 2:
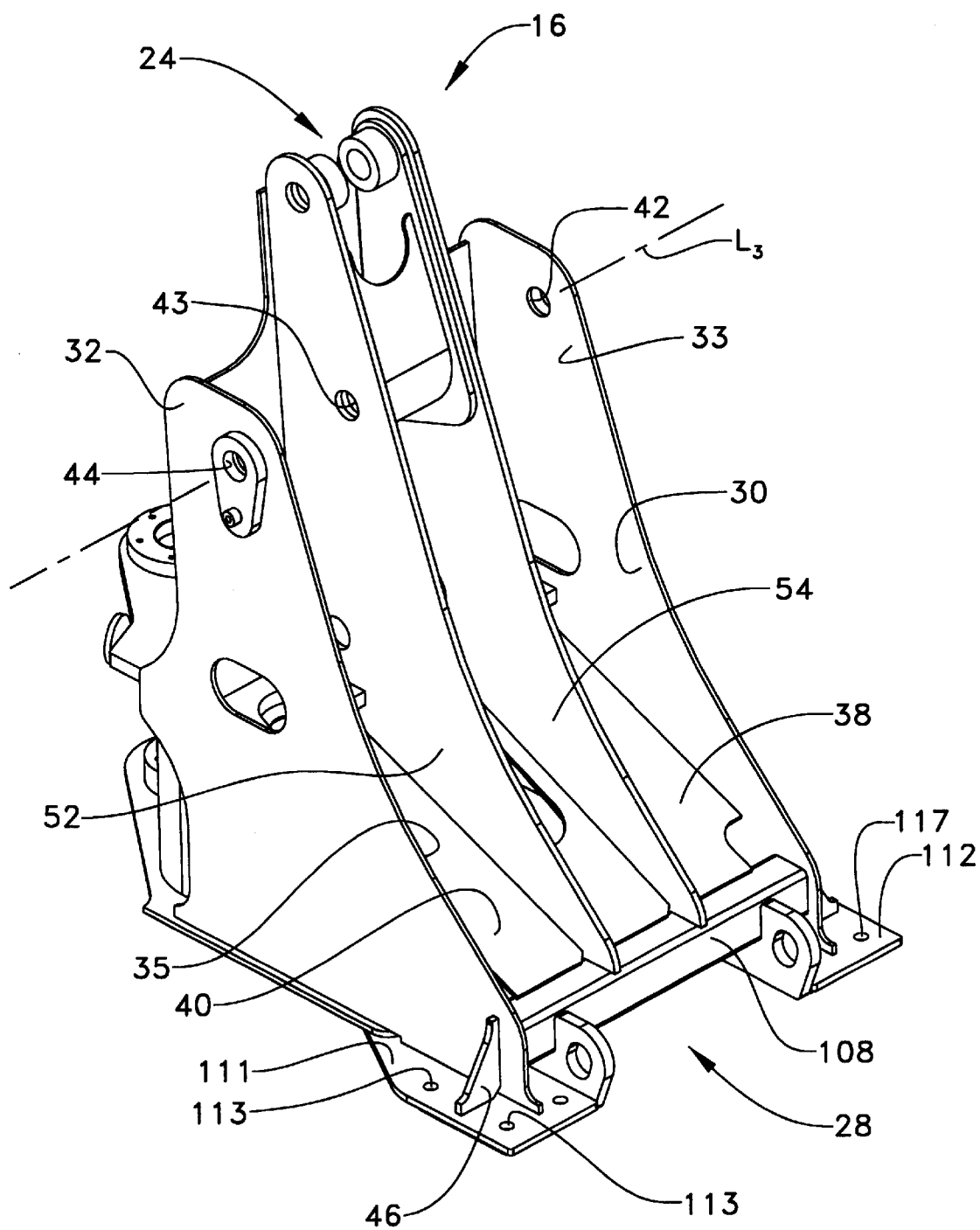
FIG. 2 is a perspective view of the frame assembly of the construction machine shown in FIG. 1.
Figure 3:
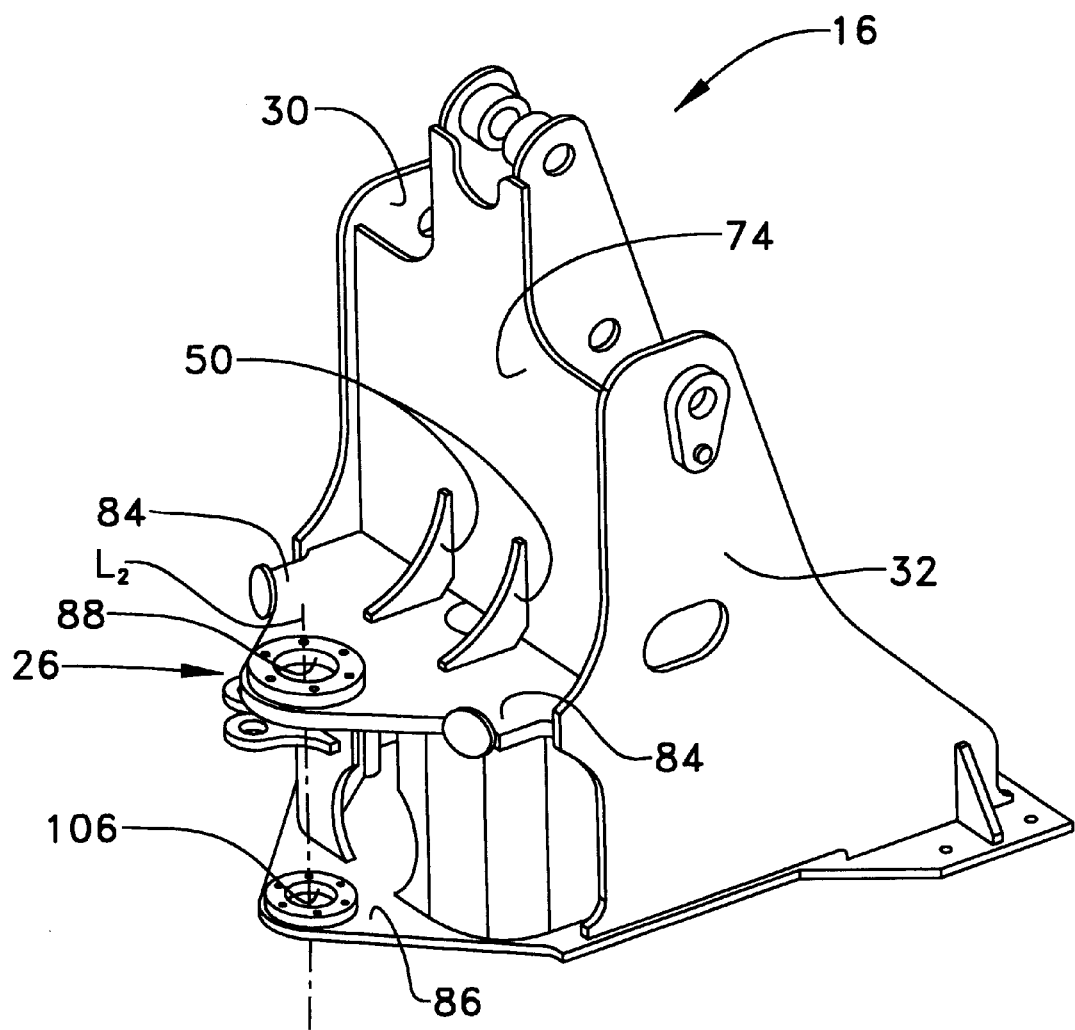
FIG. 3 is another perspective view of the frame assembly of the construction machine shown in FIG. 1.

As shown in FIGS. 2 and 3, frame assembly 16 includes a central tower portion 24, a hitch support assembly 26, an axle mount assembly 28, side wall portions 30 and 32, and spacing plates 38 and 40.

Central tower portion 24 includes side wall portions 52 and 54, a brace 68, a back wall portion extending therefrom.

A lower end 65 of arm 60 has a notch 64 defined therein. Side wall portion 54 has a leg 58 and an arm 62 extending each therefrom. A lower end 67 of arm 62 has a notch 66 defined therein. An upper portion of side wall portion 52 has a tilt pin aperture 72 defined therein. Side wall portion 52 also has a boom aperture 43 defined therein. An upper portion of side wall portion 54 has a tilt pin aperture 73 defined therein. Side wall portion 54 also has a boom aperture (not shown) defined therein which is identical to boom aperture 43.

Side wall portions 52 and 54 are secured (e.g. by welding) to back wall portion 74 such that side wall portion 52 and side wall portion 54 are horizontally spaced apart from each other so as to define an interior space 55 therebetween. In addition, side wall portions 52 and 54 are positioned relative to each other such that tilt pin apertures 72 and 73 are linearly aligned as illustrated by line $L_1$.

Central plate 80 is positioned within interior space 55 and secured to side wall portions 52 and 54. Brace 68 is also positioned within interior space 55 and secured to side wall portions 52 and 54. Brace 68 is positioned within interior space 55 so that center plate 80 and brace 68 are spaced apart.

Back wall portion 74 includes a neck portion 81 which extends upwardly from an upper end 75 of back wall portion 74 so as to define a pair of shoulders 76 and 83 of back wall portion 74. Neck portion 81 is interposed between shoulders 76 and 83.

As shown more clearly in FIGS. 6 and 7, hitch support assembly 26 includes an upper plate 84, a lower plate 86, a connecting member 96, a wall member 98, stops 102, and brackets 104. Upper plate 84 has an aperture 92, notches 90, and hitch pin aperture 88 defined therein. Lower plate 86 has an aperture 94 and hitch pin aperture 106 (see FIG. 3) defined therein. Stops 102 are attached to upper plate 84. Brackets 104 are attached to wall member 98.

Upper plate 84 and lower plate 86 are connected (e.g. by welding) to connecting member 96 such that upper plate 84 and lower plate 86 are vertically spaced from each other and connecting member 96 is interposed therebetween. Wall member 98 is also interposed between and connected to upper plate 84 and lower plate 86. Wall member 98 is spaced apart from connecting member 96 such that a passageway 100 is defined therebetween. Upper plate 84 and lower plate 86 are further positioned relative to each other such that hitch pin apertures 88 and 106 are linearly aligned as illustrated by line $L_2$ in FIG. 3.

Hitch support assembly 26 is secured to central tower portion 24 (e.g. by welding) such that a lower edge 78 (see FIG. 5) of back wall portion 74 contacts upper plate 84 as shown in FIG. 3. Hitch support assembly 26 is also secured to central tower portion 24 such that a lower end 57 of leg 56 (see FIG. 4) and a lower end 59 of leg 58 (see FIG. 4) are both supported on lower plate 86 as shown in FIG. 6. In addition, as shown in FIG. 6, hitch support assembly 26 is secured to central tower portion 24 such that legs 56 and 58 extend through aperture 92.

Referring now to FIGS. 8 and 9, axle mount assembly 28 includes axle plates 111 and 112, a support member 108, a pair of tie downs 109 and 110, and a pair of axle pads 114 and 115. Axle plate 111 has a plurality of axle housing attachment apertures 113 defined therein. Axle plate 112 also has a plurality of axle housing attachment apertures 117 defined therein. Each axle pad 114 and 115 also has a plurality of axle housing attachment apertures (not shown) defined therein.

Axle pad 114 is secured to an underside of axle plate 111 such that axle housing attachment apertures 113 align with the axle housing attachment apertures defined in axle pad 114. Axle pad 115 is secured to an underside of axle plate 112 such that axle housing attachment apertures 117 align with the axle housing attachment apertures defined in axle pad 115.

Tie down 109 is secured to an end portion of support member 108. Tie down 109 is also secured to axle plate 111. Tie down 110 is secured to an end portion of support member 108 opposite to the end portion to which tie down 109 is secured. Tie down 110 is secured to axle plate 112. Support member 108 is secured to tie downs 109 and 110 such that support member 108 extends between axle plates 111 and 112. It should be understood that tie downs 109 and 110 increase the structural strength of axle mount assembly 28.

Figure 4:
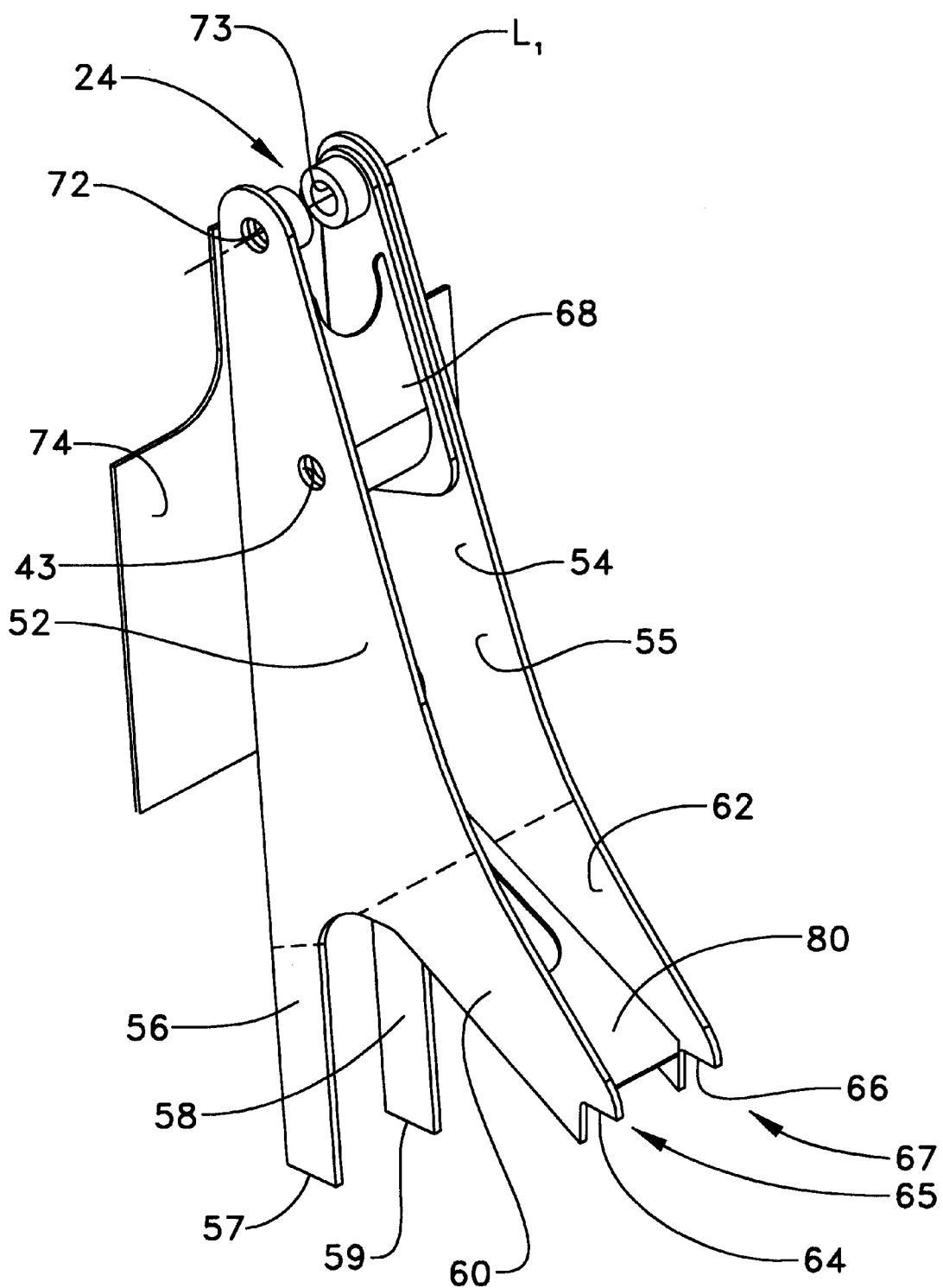
FIG. 4 is a perspective view of the central tower portion of the frame assembly of FIG. 2.

As shown in FIG. 2, axle mount assembly 28 is secured to central tower portion 24 such that support member 108 is positioned within notch 64 of arm 60 (see FIG. 4) and notch 66 of arm 62 (see FIG. 4).

Referring again to FIG. 2, side wall portion 30 has a boom aperture 42 defined therein. Side wall portion 30 is secured to an edge 79 of back wall portion 74 so that side wall portion 30 is horizontally spaced from side wall portion 54. Having side wall portion 30 horizontally spaced from side wall portion 54 defines an exterior space 33 therebetween. Side wall portion 30 is also secured to edge 79 (see FIG. 5) so that side wall portion 30 is supported on axle plate 112.

Side wall portion 32 also has a boom aperture 44 defined therein. Side wall portion 32 is secured to an edge 77 (see FIG. 5) of back wall portion 74 so that side wall portion 32 is horizontally spaced from side wall portion 52. Having side wall portion 32 horizontally spaced from side wall portion 52 defines an exterior space 35 therebetween. Side wall portion 32 is secured to edge 77 so that side wall portion 32 is supported on axle plate 111.

Side wall portions 30 and 32 are further positioned relative to side wall portions 52 and 54 such that boom apertures 42, 43, 44 and the boom aperture (not shown) defined in side wall portion 54 are linearly aligned as illustrated by line $L_3$ in FIG. 2.

Spacing plate 38 is positioned within exterior space 33 and secured to side wall portions 30 and 54. Spacing plate 38 is further positioned within exterior space 33 such that an end thereof contacts support member 108 and an end opposite to the end contacting support member 108 is located below notch 90 (see FIG. 6) defined in hitch support assembly 26.

Spacing plate 40 is positioned within exterior space 35 and secured to side wall portions 32 and 52. Spacing plate 40 is further positioned within exterior space 35 such that an end thereof contacts support member 108 and an end opposite to the end contacting support member 108 is located below notch 90 (see FIG. 6) defined in hitch support assembly 26. Spacing plates 38 and 40 increase the structural strength of frame assembly 16 and help prevent dirt and rocks from becoming trapped within exterior spaces 33 and 35. It should be understood that spacing plates 38 and 40 and central plate 80 can each have a hole defined therein to allow access to, for example, hydraulic hoses (not shown) that service front portion 15 of construction machine 10 (see FIG. 1).

Gussets are secured to frame assembly 16 at various places to increase its structural strength. Specifically a gusset 46 is secured to side wall portion 32 and axle plate 111. A gusset (not shown) is also secured to side wall portion 30 and axle plate 112. In addition, a pair of gussets 50 are secured to back wall portion 74 and upper plate 84 of hitch support assembly 26 as shown in FIG. 3.

It should be understood that preferably, frame assembly 16 is manufactured by first creating central tower portion 24, hitch support assembly 26, and axle mount assembly 28, and then securing (e.g. by welding) central tower portion 24, hitch support assembly 26, axle mount assembly 28, side wall portions 30 and 32, spacing plates 30 and 40, and central plate 80 together to create frame assembly 16.

Referring back to FIG. 1, once frame assembly 16 is assembled, it is positioned such that axle housing attachment apertures 113 and 117 (see FIG. 2) align with apertures (not shown) defined in front axle housing 17. The frame assembly 16 is further positioned relative to front axle housing 17 such that a portion thereof extends into aperture 94 of hitch support assembly 26 (see FIG. 6). Bolts (not shown) are then inserted through axle housing attachment apertures 113 and 117, and the apertures defined in front axle housing 17 thereby mounting frame assembly 16 to front axle housing 17.

Once frame assembly 16 is mounted onto front axle housing 17, a bifurcated end (not shown) of boom 20 is pinned to central tower portion 24 (see FIG. 2) utilizing boom apertures 42, 43, 44 and the boom aperture (not shown) defined in side wall portion 54. An end of boom 20, opposite to the bifurcated end, is secured to work implement 18. In addition, one end of tilt cylinder 22 is pinned to central tower portion 24 utilizing tilt pin apertures 72 and 73 (see FIG. 4). An end of tilt cylinder 22 opposite to the one secured to frame assembly 16 is mechanically attached to work implement 18. Boom 20, tilt cylinder 22, and the lift cylinder (not shown) cooperate to allow an operator (not shown) positioned within cab assembly 12 to actuate work implement 18.

Front portion 15 is secured to rear portion 11 by aligning hitch pin apertures 88 and 106 (see FIG. 3) with the hitch pin apertures (not shown) defined in hitch 27 (see FIG. 1) and pinning hitch support assembly 26 to hitch 27. Hydraulic hoses (not shown) are extended through passageway 100 (see FIG. 7) to service front portion 15. A steering cylinder (not shown) is then secured to brackets 104 (see FIG. 7) and main frame 13. Attaching rear portion 11 and front portion 15 in the above described manner allows construction machine 10 to be steered by rotating front portion 15 relative to rear portion 11 in the directions indicated by arrows 174 and 176 as shown in FIG. 1.

Although not shown in FIGS. 1–9, any linearly aligned apertures (i.e. hitch pin apertures 88 and 106 (see FIG. 3), tilt pin apertures 72 and 73 (see FIG. 4), and boom apertures 42, 43, and 44 (see FIG. 2)) defined in frame assembly 16 may be formed by utilizing a top hat boss 116 and a boss 126. As shown in FIGS. 10, 11, and 12, top hat boss 116 includes a flange 118 and a cylinder portion 120 extending from flange 118. Cylinder portion 120 defines a passageway 122 which extends through top hat boss 116. Top hat boss 116 also includes a number of bolt holes 124 defined in flange 118. Boss 126 has a passageway 128 and a number of bolt holes 130 defined therein. Bolt holes 124 and 130 allow a frame part to be attached to top hat boss 116 or boss 126 if necessary. However, it should be understood that if no frame part is attached to top hat boss 116 or boss 126, then top hat boss 116 and boss 126 do not have to have bolt holes defined therein.

As shown in FIG. 13, in order to facilitate the creation of linearly aligned apertures in frame assembly 16 utilizing top hat boss 116 and boss 126, a laser is used to cut a bore 134 through a frame part 132. Top hat boss 116 is then positioned relative to frame part 132 such that cylinder portion 120 extends through bore 134 and flange 118 contacts frame part 132. Another bore 144 is laser cut through a frame part 142. A top hat boss 146, substantially identical to top hat boss 116, is then positioned relative to frame part 142 such that cylinder portion 150 extends through bore 144 and flange 148 contacts frame part 142. It should be understood that bores 134 and 144 are cut large enough such that cylinder portions 120 and 150 do not contact frame parts 132 and 142, respectively. Have bores 134 and 144 cut in such a manner allows top hat bosses 116 and 146 to move relative to frame parts 132 and 142 while positioned bores 134 and 144, respectively, and thus facilitates their alignment.

Once top hat boss 116 is positioned in bore 134, boss 126 is positioned relative to top hat boss 116 such that cylinder portion 120 extends into passageway 128 of boss 126. In a similar manner, once top hat boss 146 is positioned in bore 144, a boss 154 is positioned relative to top hat boss 146 such that cylinder portion 150 of top hat boss 146 extends into passageway 153 of boss 154.

An expandable alignment bar 140 is then simultaneously positioned within passageway 122 of top hat boss 116 and passageway 152 of top hat boss 146 as shown in FIG. 13. Alignment bar 140 is also simultaneously positioned within passageway 128 of boss 126 and passageway 153 of boss 154. Positioning alignment bar 140 within passageways 122, 152, 128, and 153 (1) locates top hat boss 116 and boss 126 at a first alignment position relative to frame part 132, and (2) locate top hat boss 146 and boss 154 at a second alignment position relative to frame part 142. Top hat boss 116 and boss 126 are then welded to frame part 132 at weld points 138. Top hat boss 146 and boss 154 are welded to frame part 142 at weld points 156. Thereafter, alignment bar 140 is removed to yield linearly aligned apertures defined by top hat bosses 116 and 146.

Figure 14:
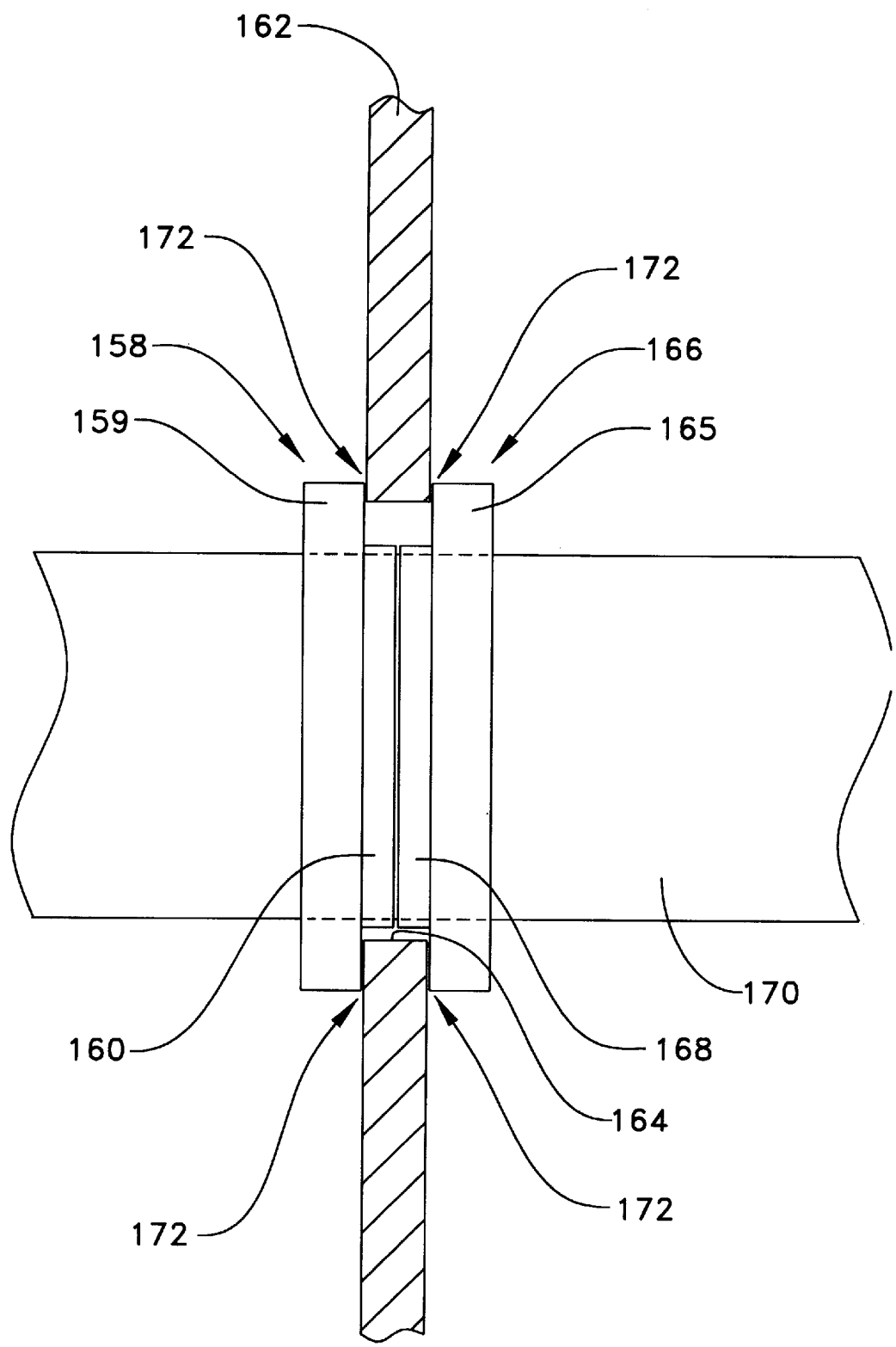
FIG. 14 is a side elevational view of a first and second top hat boss inserted within the same bore of a frame part, and an alignment bar positioned within the first and second top hat boss (note that the frame part is shown in cross-section, and only a fragment of the alignment bar is shown, for clarity of description).

Referring now to FIG. 14, there is shown an alternative method of utilizing a top hat boss to facilitate creation of linearly aligned apertures in a frame assembly. Specifically, a bore 164 is cut through a frame part 162. Top hat boss 158 is then positioned relative to frame part 162 such that cylinder portion 160 extends into bore 164 and flange 159 contacts frame part 162. A second top hat boss 166 is also positioned relative to frame part 162, in an opposing relationship to top hat boss 158, such that cylinder portion 168 extends into bore 164 and flange 165 contacts frame part 162.

A second pair of top hat bosses (not shown) are positioned in a bore created in a second frame part (not shown) in an identical manner. An alignment bar 170 is then positioned within the passageways of top hat bosses 158 and 166 so as to locate top hat bosses 158 and 166 at a first alignment position relative to frame part 162. Alignment bar 170 is also positioned within the passageways of the second pair of top hat bosses so as to locate the second pair of top hat bosses at a second alignment position relative to the second frame part. Top hat bosses 158 and 166 are then welded to frame part 162 at weld points 172. The second pair of top hat bosses are welded to the second frame part in an identical manner. Thereafter, alignment bar 170 is removed to yield linearly aligned apertures defined by top hat bosses 158, 166 and the second pair of top hat bosses.

Industrial Applicability

The frame assembly 16 set forth above is designed to cooperate with, and mount, a single boom having a bifurcated end. As such, frame assembly 16 is relatively compact as compared to other frame assemblies. The compactness of frame assembly 16 provides an operator positioned in cab assembly 12 with a relatively unobstructed view of work implement 18. The increased visibility of work implement 18 results in an increase in construction machine 10 performance and productivity.

However, even though frame assembly 16 is relatively small and compact, it still possess the structural strength required to accommodate the high loads generated during the use of work implement 18. One reason frame assembly 16 can accommodate these high loads is that its structure is designed to efficiently transfer loads from work implement 18 through central tower portion 24 to front axle housing 17 (via axle mount assembly 28) and main frame 13 (via hitch support assembly 26).

Furthermore, frame assembly 16 is designed so it can be manufactured by first creating the smaller subassemblies (i.e. central tower portion 24, hitch support assembly 26, and axle mount assembly 28) and then securing the subassemblies together to create frame assembly 16. Creating the aforementioned smaller subassemblies first, allows frame assembly 16 to be manufactured utilizing smaller less expensive machining centers. Being able to utilize smaller less expensive machining centers decreases the manufacturing cost of frame assembly 16.

Moreover, an alternative method to reduce manufacturing costs of frame assembly 16 even further is to laser cut or plasma cut bores in the plate components (e.g. side wall portions 52 and 54, upper plate 84 and lower plate 86) of frame assembly 16 prior to being welded together to form the aforementioned subassemblies and then utilize top hat bosses 116, 146 and alignment bar 140 to create linearly aligned apertures as discussed previously.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, it should be understood that while top hat bosses 116, 146, 158 and 166 are described above as being utilized to create linearly aligned bores in a frame assembly, these top hat bosses can also be utilized to created linearly aligned bores in all types and sizes of fabricated structures.

What is claimed is:

1. A frame assembly, comprising:
   a central tower portion having a first side wall portion and a second side wall portion, wherein said first side wall portion has a first leg and a first arm each extending therefrom, and said second side wall portion has a second leg and a second arm each extending therefrom;
   a hitch support assembly having an upper plate and a lower plate vertically spaced from each other, and a connecting member interposed between and connected to said upper plate and said lower plate, said hitch support assembly being secured to said central tower portion such that a lower end of both said first leg and said second leg are supported on said lower plate; and
   an axle mount assembly having a first axle plate, a second axle plate, and a support member extending therebetween, wherein both said first arm and said second arm are secured to said support member.

2. The frame assembly of claim 1, wherein:
   said upper plate of said hitch support assembly has an aperture defined therein, and both said first leg and said second leg extend through said aperture.

3. The frame assembly of claim 2, wherein:

a first lower end of said first arm has a first notch defined therein, a second lower end of said second arm has a second notch defined therein, and said support member of said axle mount assembly is positioned within said first notch and said second notch.

4. The frame assembly of claim 3, wherein:

said first side wall portion and said second side wall portion are horizontally spaced apart from each other so as to define an interior space therebetween.

5. The frame assembly of claim 4, further comprising:

a central plate secured to said first side wall portion and said second side wall portion so that said central plate is positioned within said interior space.

6. The frame assembly of claim 5, wherein said central tower portion further includes:

a back wall portion secured to both said first side wall portion and said second side wall portion.

7. The frame assembly of claim 6, wherein:

said back wall portion includes a neck portion which extends upwardly from an upper end of said back wall portion so as to define a first shoulder and a second shoulder, and said neck portion is interposed between said first shoulder and said second shoulder.

8. The frame assembly of claim 7, further comprising:

a third side wall portion secured to said back wall portion so that said third side wall portion and said first side wall portion are horizontally spaced from each other so as to define a first exterior space therebetween;

a fourth side wall portion secured to said back wall portion so that said fourth side wall portion and said second side wall portion are horizontally spaced from each other so as to define a second exterior space therebetween;

a first spacing plate secured to both said third side wall portion and said first side wall portion so that said first spacing plate is positioned within said first exterior space; and a second spacing plate secured to both said forth side wall portion and said second side wall portion so that said second spacing plate is positioned within said second exterior space.

9. The frame assembly of claim 8, further comprising:

a first axle pad secured to an underside of said first axle plate, and a second axle pad secured to an underside of said second axle plate.

10. The frame assembly of claim 9, further comprising:

a brace secured to both said first side wall portion and said second side wall portion so that said brace is (1) positioned within said interior space, and (2) spaced apart from said center plate.

11. The frame assembly of claim 1, wherein:

an upper portion of said first side wall portion has a first tilt pin aperture defined therein, an upper portion of said second side wall portion has a second tilt pin aperture defined therein, and said first tilt pin aperture is linearly aligned with said second tilt pin aperture.

12. The frame assembly of claim 11, wherein:

said upper plate has a first hitch pin aperture defined therein, said lower plate has a second hitch pin aperture defined therein, and said first hitch pin aperture is linearly aligned with said second hitch pin aperture.

13. The frame assembly of claim 12, wherein:

said first axle plate has a plurality of first axle housing attachment apertures defined therein, and said second axle plate has a plurality of second axle housing attachment apertures defined therein.

* * * * *